United States Patent
Hirayama

(10) Patent No.: US 8,652,569 B2
(45) Date of Patent: Feb. 18, 2014

(54) OPTICAL WAVEGUIDE PRODUCTION METHOD

(75) Inventor: Tomoyuki Hirayama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/236,781

(22) Filed: Sep. 20, 2011

(65) Prior Publication Data

US 2012/0107495 A1    May 3, 2012

Related U.S. Application Data

(60) Provisional application No. 61/411,108, filed on Nov. 8, 2010.

(30) Foreign Application Priority Data

Oct. 27, 2010   (JP) ................................ 2010-240996

(51) Int. Cl.
    *B05D 5/06*    (2006.01)

(52) U.S. Cl.
    USPC .......................... 427/163.2; 427/133; 427/162

(58) Field of Classification Search
    USPC ....................................... 427/133, 163.2, 162
    See application file for complete search history.

(56) References Cited

U.S. PATENT DOCUMENTS

| | | | |
|---|---|---|---|
| 3,957,411 A | 5/1976 | Schiesser | |
| 2003/0117614 A1* | 6/2003 | Kikuchi et al. | 356/73.1 |
| 2005/0212182 A1 | 9/2005 | Yokoyama et al. | |
| 2006/0091571 A1 | 5/2006 | Akutsu et al. | |
| 2007/0014523 A1 | 1/2007 | Ohtsu et al. | |
| 2007/0064188 A1* | 3/2007 | Okamoto | 349/135 |
| 2008/0013903 A1* | 1/2008 | Fujii et al. | 385/123 |
| 2008/0193094 A1 | 8/2008 | Enami et al. | |
| 2008/0198144 A1 | 8/2008 | Shimizu et al. | |
| 2008/0277809 A1* | 11/2008 | Shimizu | 264/1.24 |

(Continued)

FOREIGN PATENT DOCUMENTS

| | | |
|---|---|---|
| JP | 51-42760 A | 4/1976 |
| JP | S60-141512 A | 7/1985 |

(Continued)

OTHER PUBLICATIONS

U.S. Office Action dated Sep. 14, 2012, issued in copending related U.S. Appl. No. 13/173,887.

(Continued)

*Primary Examiner* — Elizabeth Burkhart

(74) *Attorney, Agent, or Firm* — Westerman, Hattori, Daniels & Adrian, LLP

(57) ABSTRACT

An optical waveguide production method is provided which reduces a transmission loss, improves alignment mark visual detectability, and ensures excellent productivity. In the optical waveguide production method, an under-cladding layer, a core and an alignment mark are formed on a surface of a metal substrate. On the other hand, a molding die is prepared which includes a cavity and an alignment mark to be associated with the alignment mark. In turn, light emitted from the side of the molding die is utilized for positioning the metal substrate and the molding die with reference to the pair of associated alignment marks. Then, an over-cladding layer is formed over the core. The alignment mark is formed from a photo-curable composition comprising the following components (A) and (B):

(A) a polymerizable composition having a (meth)acrylate group; and
(B) a photoradical polymerization initiator.

8 Claims, 4 Drawing Sheets

(56) References Cited

U.S. PATENT DOCUMENTS

| | | | |
|---|---|---|---|
| 2009/0196559 A1* | 8/2009 | Makino et al. | 385/126 |
| 2009/0261488 A1 | 10/2009 | Shimizu | |
| 2009/0286187 A1 | 11/2009 | Hodono et al. | |
| 2012/0251038 A1 | 10/2012 | Nagafuji et al. | |

FOREIGN PATENT DOCUMENTS

| | | | |
|---|---|---|---|
| JP | 61-138903 A | 6/1986 | |
| JP | 5-228946 A | 9/1993 | |
| JP | 2002-120286 A | 4/2002 | |
| JP | 2002-321227 A | 11/2002 | |
| JP | 2004-050493 A | 2/2004 | |
| JP | 2004-117585 A | 4/2004 | |
| JP | 2004-184480 A | 7/2004 | |
| JP | 2005-017816 A | 1/2005 | |
| JP | 2005-290106 A | 10/2005 | |
| JP | 2008-203431 A | 9/2008 | |
| JP | 2008-281654 A | 11/2008 | |
| JP | 2009-258417 A | 11/2009 | |
| JP | 2009-276724 A | 11/2009 | |
| WO | 2008/062836 A1 | 5/2008 | |

OTHER PUBLICATIONS

U.S. Office Action dated Sep. 17, 2012, issued in copending related U.S. Appl. No. 13/173,391.
U.S. Office Action dated Dec. 20, 2012, issued in related U.S. Appl. No. 13/113,220.
Notice of Allowance and Fee(s) Due dated Mar. 7, 2013, issued in related U.S. Appl. No. 13/173,391.
Notice of Allowance and Fee(s) Due dated Mar. 4, 2013, issued in related U.S. Appl. No. 13/173,887.
U.S. Office Action dated May 31, 2013, issued in related U.S. Appl. No. 13/113,220.
Japanese Office Action dated Jun. 11, 2013, issued in corresponding Japanese Patent Application No. 2010-153343, w/ English translation.
Japanese Office Action dated Jun. 11, 2013, issued in related Japanese Patent Application No. 2010-153342, w/ English translation.
Japanese Office Action dated Jun. 25, 2013, issued in related application No. 2010-126714, with English Translation.
U.S. Non-Final Office Action dated Aug. 16, 2013, issued in related U.S. Appl. No. 13/173,391.
U.S. Non-Final Office Action dated Aug. 19, 2013, issued in related U.S. Appl. No. 13/173,887.
U.S. Non-Final Office Action dated Sep. 10, 2013, issued in related U.S. Appl. No. 13/113,220.
U.S. Office Action dated Dec. 2, 2013, issued in related U.S. Appl. No. 13/173,391.
U.S. Office Action dated Dec. 5, 2013, issued in related U.S. Appl. No. 13/173,887.

* cited by examiner

OPTICAL WAVEGUIDE PRODUCTION METHOD

RELATED APPLICATIONS

This application claims the benefit of U.S. Provisional Application No. 61/411,108, filed on Nov. 8, 2010, which is hereby incorporated by reference.

BACKGROUND OF THE INVENTION

1. Field of the Invention

The present invention relates to a production method of an optical waveguide to be widely used for optical communications, optical information processing, position sensors, and other general optics.

2. Description of the Related Art

Optical waveguides typically include a core provided in a predetermined pattern as a light path on a surface of an under-cladding layer, and an over-cladding layer covering the core. For improvement of mass-productivity, the optical waveguides are produced by a roll-to-roll process, which employs a metal substrate such as of stainless steel (SUS) capable of bearing a stress (cure shrinkage) occurring when a resin material is cured.

The SUS is a less expensive material substantially free from warpage which may otherwise occur due to a shrinkage stress of a coating film. On the other hand, the SUS is a metal that has a rough surface having minute irregularities and, therefore, is liable to cause irregular light reflection during an exposure process in formation of the core. This results in roughened wall surfaces of the core. To cope with this, it is proposed, for example, to blend a UV absorber in an under-cladding layer material for suppressing the back reflection of the metal substrate such as of the SUS (see JP-A-2009-276724).

For production of an optical touch panel including the optical waveguide of this type, it is necessary to employ an imprint process in order to impart a light output portion and a light input portion of the over-cladding layer with a lens shape. At this time, the steps of preliminarily forming an alignment mark on the core, positioning the core and the over-cladding layer with respect to each other while recognizing the alignment mark by means of an alignment camera, and bonding the core and the over-cladding layer together are essential for improvement of the accuracy of the positioning of a light output end of the core and the over-cladding layer (lens) (see JP-A-2008-203431).

In the conventional optical waveguide production process, a light source capable of emitting visible light (in a wavelength range of about 400 to about 700 nm) is used for the alignment camera, and the SUS is typically used for the metal substrate. Therefore, the alignment camera is liable to pick up an image of the rough surface of the SUS. This, for example, reduces the contrast of an edge of the alignment mark provided on the core, resulting in disadvantageous reduction in the accuracy of the detection of the alignment mark by the alignment camera. To cope with this disadvantage, it is proposed, for example, to form an alignment mark having a rounded edge by exposure with a halftone mask in the alignment mark forming step to increase the contrast of the alignment mark for improvement of the degree of the recognition. However, the formation of the alignment mark by the exposure method using the halftone mask leads to lower finishing accuracy. Therefore, this method is not satisfactory for the improvement of the recognition of the alignment mark, reducing the production efficiency (yield).

SUMMARY OF THE INVENTION

In view of the foregoing, an optical waveguide production method is provided which reduces the transmission loss of the optical waveguide, improves the visual detectability of the alignment mark, and ensures excellent productivity.

An optical waveguide production method includes the steps of: forming an under-cladding layer on a surface of a metal substrate; forming a core in a pattern on a surface of the under-cladding layer; forming an alignment mark at a predetermined position on the under-cladding layer; preparing a molding die which includes a cavity having a mold surface complementary in shape to an over-cladding layer and has an alignment mark provided at a predetermined position to be associated with the alignment mark formed on the under-cladding layer; bringing the molding die into opposed relation to the metal substrate formed with the core and the under-cladding layer, and positioning the molding die with respect to the metal substrate with reference to the pair of alignment marks associated with each other by utilizing light emitted at a wavelength of 400 to 700 nm from a molding die side; and forming the over-cladding layer to cover the core; wherein a material for the alignment mark to be formed at the predetermined position on the under-cladding layer is a photo-curable composition comprising the following components (A) and (B):

(A) a polymerizable compound having a (meth)acrylate group; and (B) a photoradical polymerization initiator.

The alignment camera is liable to pick up the image of the rough surface of the SUS in the positioning with the use of the alignment mark and, therefore, the accuracy of the detection of the alignment mark is reduced to reduce the production efficiency. First, the material for the alignment mark was studied in order to increase the contrast of the alignment mark with respect to the image of the rough surface of the SUS picked up by the alignment camera and clearly define the alignment mark for improvement of the accuracy of the detection of the alignment mark by the alignment camera. Where the polymerizable compound (A) having the (meth)acrylate group and the photoradical polymerization initiator (B) are used as materials for the alignment mark, a curing failure occurs in an outermost portion of the alignment mark due to oxygen inhibition during the photoradical polymerization, and an upper portion of a cured component obtained after development is smaller in diameter than middle and bottom portions of the cured component and rounded in shape.

In general, various attempts have been made in order to alleviate the influences of the oxygen inhibition for fear of increase in the loss of the optical waveguide occurring due to shape anomaly in the production of the optical waveguide by the photo-curing. However, where the alignment mark is formed as having the upper portion shaped in the aforementioned manner by utilizing the oxygen inhibition and the curing failure of the photo-curable composition comprising the components (A) and (B) in contradiction to the technical common knowledge, the alignment mark has an improved contrast over the image of the rough surface of the SUS picked up by the alignment camera. As a result, the alignment mark has an improved geometrical accuracy as compared with the conventional alignment mark having a lower finishing accuracy and formed by rounding the edge portion through the exposure with the halftone mask. Thus, the alignment mark has an improved contrast over the picked up image of the rough surface of the SUS.

The optical waveguide production method employs the photo-curable composition comprising the polymerizable compound (A) having the (meth)acrylate group and the photoradical polymerization initiator (B) as the alignment mark material. Therefore, the curing failure occurs in the outermost portion of the formed alignment mark due to the oxygen inhibition during the photoradical polymerization, and the upper portion of the cured component (core) obtained after the development has a rounded tapered shape. This improves the contrast of the alignment mark and hence the visual detectability of the alignment mark by the alignment camera. This further improves the production yield of the optical waveguide, leading to excellent productivity.

DETAILED DESCRIPTION OF THE INVENTION

Next, embodiments of the present invention will be described in detail with reference to the drawings.

<<Optical Waveguide Production Method>>

First, an optical wave guide production method will be described in detail.

A planar metal substrate 10 (see FIG. 1A) to be used for formation of an under-cladding layer 1 is prepared. Exemplary materials for the substrate 10 include various metals. Particularly, a SUS substrate is preferred, because the SUS is highly resistant to thermal contraction/expansion and the dimensions of various components are generally maintained as designed during the production of the optical waveguide. The substrate 10 has a thickness of, for example, 20 μm (film) to 5 mm (plate).

<Formation of Under-Cladding Layer>

Figure 1A:
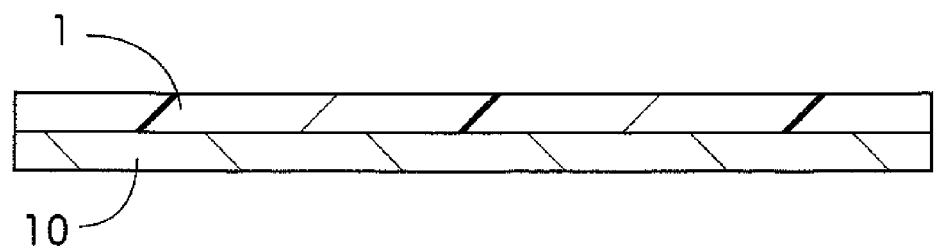
FIGS. 1A to 1C are schematic diagrams for explaining an inventive optical waveguide production method.

Then, as shown in FIG. 1A, the under-cladding layer 1 is formed on a surface of the substrate 10. A thermosetting resin or a photosensitive resin is used as a material for the under-cladding layer 1. Where the thermosetting resin is used, the formation of the under-cladding layer 1 is achieved by applying a varnish prepared by dissolving the thermosetting resin in a solvent and then heating the varnish. On the other hand, where the photosensitive resin is used, the formation of the under-cladding layer 1 is achieved by applying a varnish prepared by dissolving the photosensitive resin in a solvent and then exposed to radiation such as ultraviolet radiation. The under-cladding layer has a thickness of, for example, 5 to 30 μm.

<Formation of Cores and Formation of Alignment Marks>

Figure 1B:
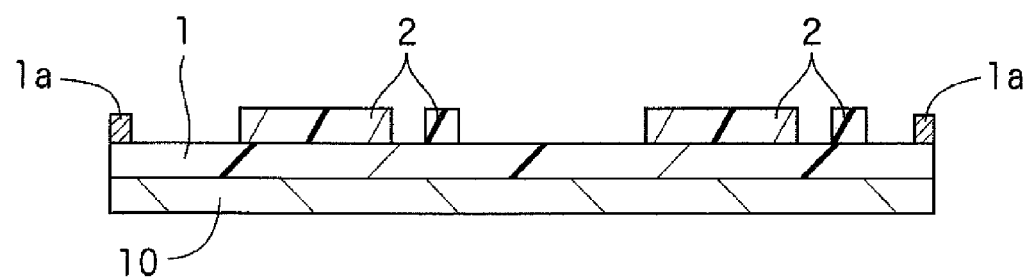

Then, as shown in FIG. 1B, cores 2 of a predetermined pattern and alignment marks 1a are formed on a surface of the under-cladding layer 1 by a photolithography process. For the formation of the cores 2 and the alignment marks 1a, for example, a core material (alignment mark material) is applied onto the surface of the under-cladding layer 1 and dried under predetermined conditions to form a coating layer. In turn, the coating layer is exposed via a predetermined photomask (designed for formation of the core pattern and the alignment marks), and then heat-treated. Subsequently, an unexposed portion of the coating layer is removed with a developing liquid for development, then rinsed with water, and dried. Thus, the pattern of the cores 2 and the alignment marks 1a are formed. The cores 2 thus formed each have a width of, for example, 10 to 500 μm. The cores 2 each have a thickness (height) of, for example, 25 to 100 μm.

The formation of the alignment marks 1a will be described in greater detail. As described above, the photosensitive material is applied as the core material (alignment mark material) onto the under-cladding layer 1 by means of an applicator, and then dried. After the drying, the resulting photosensitive material film is exposed by irradiation with radiation such as ultraviolet radiation via a photomask of a predetermined configuration (designed for the formation of the cores and the alignment marks) and heat-treated, whereby exposed portions of the photosensitive material film are cured. At this time, a curing failure occurs in outermost portions of the alignment marks 1a due to oxygen inhibition during the photoradical polymerization. Then, a development process is performed with the use of a developing liquid (γ-butyrolactone) and an unexposed portion is rinsed away with water, followed by drying. Thus, the cores 2 of the predetermined core pattern and the alignment marks 1a are formed. At this time, upper portions of cured components obtained after the development are smaller in diameter than intermediate and bottom portions of the components, and rounded in shape.

The core material (alignment mark material) is a photo-curable composition containing: (A) a polymerizable compound having a (meth)acrylate group; and (B) a photoradical polymerization initiator. The term "(meth)acrylate" means acrylate or methacrylate.

Specific examples of the polymerizable compound (A) having the (meth)acrylate group include copolymers of a difunctional epoxy acrylate of bis-A type and a tetracarboxylic acid anhydride of pyromellitic acid anhydride type (e.g., FNR series and the like available from Nagase Chemtex Corporation), and polymers modified with multifunctional epoxy acrylates of cresol novolak and phenol novolak types. These may be used either alone or in combination.

Examples of the photoradical polymerization initiator include
2,2-dimethoxy-1,2-diphenylethan-1-one,
1-hydroxycyclohexyl phenyl ketone,
2-hydroxy-2-methyl-1-phenylpropan-1-one,
1-[4-(2-hydroxyethoxy)-phenyl]-2-hydroxy-2-methyl-1-propane,
2-hydroxy-1-{4-[4-(2-hydroxy-2-methylpropyonyl)benzyl]phenyl}-2-methylpropan-1-one,
2-benzyl-2-dimethylamino-1-(4-morpholinophenyl)butanone-1,
2-methyl-1-[4-(methylthio)phenyl]-2-morpholinopropan-1-one, bis(2,4,6-trimethylbenzoyl)phenylphosphine oxide, 2,4,6-trimethylbenzoyldiphenylphosphine oxide, and
bis(η5-2,4-cyclopentadien-1-yl)-bis(2,6-difluoro-3(1H-pyrrol-1-yl)phenyl) titanium, which may be used either alone or in combination. From the viewpoint of the patternability, 2-methyl-1-[4-(methylthio)phenyl]-2-morpholinopropan-1-one is particularly preferred.

The proportion of the photoradical polymerization initiator is preferably 0.5 to 10 parts by weight, particularly preferably 1 to 5 parts by weight, based on 100 parts by weight of the polymerizable compound (A) having the (meth)acrylate group. If the proportion is too small, it is difficult to provide a sufficient photopolymerization effect, leading to collapse of the pattern during the development. If the proportion is too great, the resolution tends to be deteriorated with shape anomaly such as the thickening of the pattern and the continuation of the pattern.

The material for the cores 2 has a higher refractive index and is more transmissive to the wavelength of light to be transmitted through the cores 2 than the materials for the under-cladding layer 1 and an over-cladding layer 3 (see FIG. 3) to be described later. The refractive index may be properly increased or reduced by changing at least one of the type and the proportion of an organic group to be incorporated in a resin material for the under-cladding layer 1, the cores 2 or the over-cladding layer 3. For example, the refractive index can be increased by incorporating an aromatic ring group (e.g., a phenyl group or the like) in a resin molecule or by increasing the proportion of the aromatic group in the resin molecule. On the other hand, the refractive index can be reduced by incorporating a linear or cyclic aliphatic group (a methyl group, a norbornene group or the like) in a resin molecule or by increasing the proportion of the aliphatic group in the resin molecule.

Figure 6:
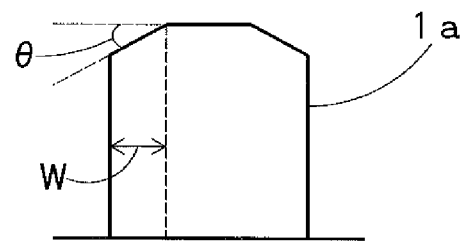
FIG. 6 is an enlarged side view schematically showing the shape of an alignment mark formed by the inventive optical waveguide production method.

As described above, the alignment marks 1a are formed together with the cores 2 from the aforementioned material at predetermined positions at the opposite ends (see FIG. 1B) of the under-cladding layer 1. The shapes of the alignment marks 1a are not particularly limited, but the alignment marks 1a may each have any shape as long as the alignment marks 1a are visually detectable. More specifically, as shown in FIG. 6, the alignment marks 1a each have a generally cylindrical shape with a top surface peripheral edge thereof being tapered. With the use of the core material (alignment mark material), a curing failure occurs in outermost portions of the thus formed alignment marks 1a due to oxygen inhibition during the photoradical polymerization. Thus, upper portions of cured components obtained after the development are rounded and tapered. As shown in FIG. 6, the alignment marks 1a are preferably each configured to have a taper angle θ of 30 to 45 degrees, particularly preferably 35 to 40 degrees, and a taper width W of not less than 3.5 μm, particularly preferably 4 to 6 μm. The alignment marks 1a formed as having a taper angle θ and a taper width W in the aforementioned ranges each have an improved contrast. As a result, the alignment marks 1a can be easily detected by the alignment camera.

<Formation of Over-Cladding Layer>

Figure 1C:
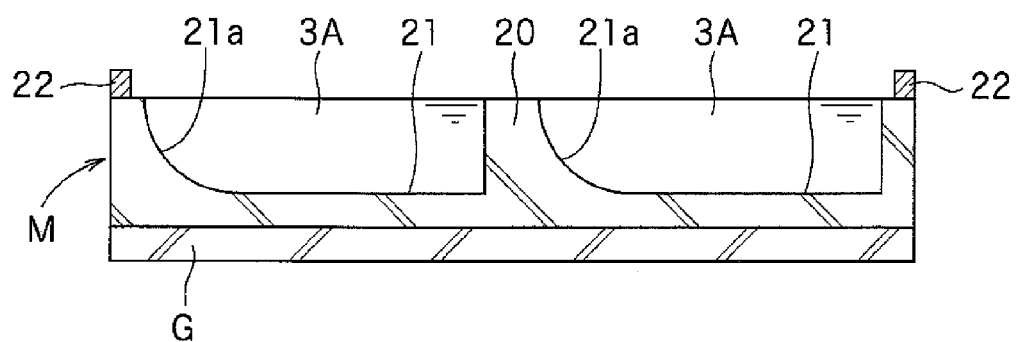

On the other hand, as shown in FIG. 1C, a molding die M for formation of the over-cladding layer is prepared. A light transmissive resin (e.g., a silicone resin, an acryl resin, an epoxy resin or the like) and a light transmissive support plate G (e.g., quartz glass, blue plate glass, a polycarbonate, an acryl or the like), for example, are used as materials for the molding die M, and the molding die M is produced by molding and curing the light transmissive resin with the use of a mold member conformal to the over-cladding layer and bonding the resulting cured body onto the light transmissive support plate G. The molding die M (see FIG. 1C) is such that the light transmissive support plate G is bonded to a lower surface of the cured light-transmissive resin body 20. The cured light-transmissive resin body 20 includes two cavities 21 formed in an upper surface thereof as each having a mold surface complementary in shape to the over-cladding layer 3. The cavities 21 each have a curved lens surface 21a provided along one edge portion thereof (at a left end in FIG. 1C).

Alignment marks 22 are provided at opposite end portions of the molding die M to be associated with the alignment marks 1a provided on the under-cladding layer 1. The shapes of the alignment marks 22 are not particularly limited as long as the alignment marks 22 conform in shape to the alignment marks 1a provided on the under-cladding layer 1. Further, the alignment marks 22 are formed in substantially the same manner as the alignment marks 1a.

Figure 5:
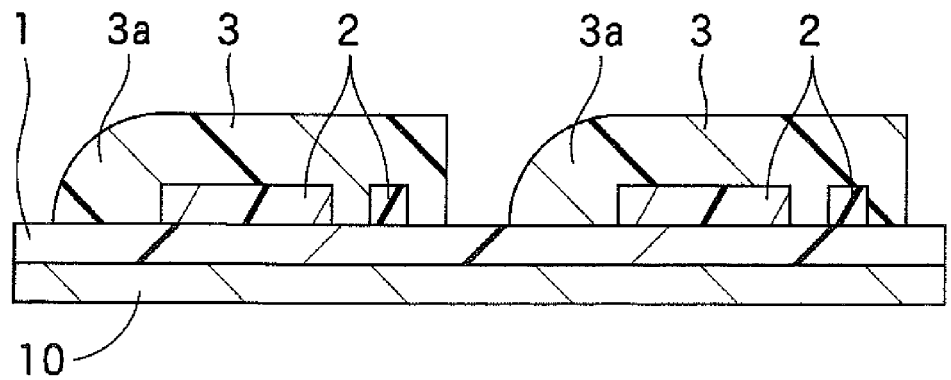
FIG. 5 is a sectional view schematically illustrating an optical waveguide produced by the production method described above.

Then, the molding die M is placed on a molding stage (not shown) with its cavities 21 facing up, and the cavities 21 are each filled with a liquid photosensitive resin 3A as a material for the over-cladding layer 3 (see FIG. 5). Examples of the photosensitive resin 3A include liquid resin compositions prepared by mixing a photopolymerization initiator and other additives in a UV-curable resin such as a UV-curable epoxy resin, a UV-curable siloxane resin, a UV-curable norbornene resin or a UV-curable polyimide resin, and dissolving the resulting mixture in a solvent.

Figure 2:
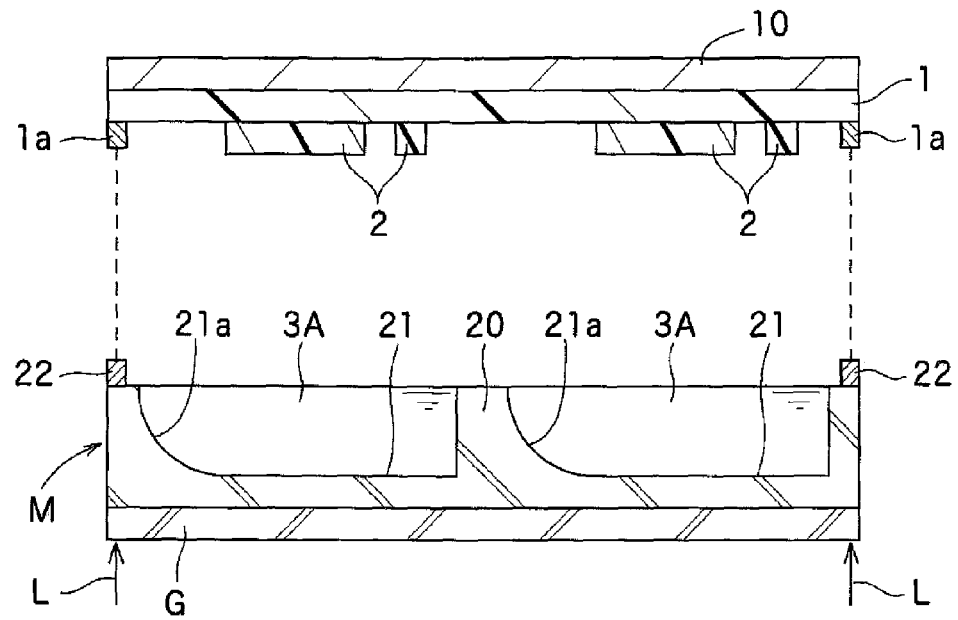
FIG. 2 is a schematic diagram for explaining the inventive optical waveguide production method.

In turn, as shown in FIG. 2, the under-cladding layer 1 formed with the pattern of the cores 2 is positioned in opposed relation above the molding die M with the cavities 21 filled with the liquid photosensitive resin 3A. At this time, the alignment marks 1a provided on the under-cladding layer 1 are respectively aligned with the alignment marks 22 provided on the molding die M for the positioning by emitting light from the alignment camera from the side of the molding die M in an arrow direction L. The light for the alignment camera typically has a wavelength of 400 to 700 nm in the visible range.

Figure 3:
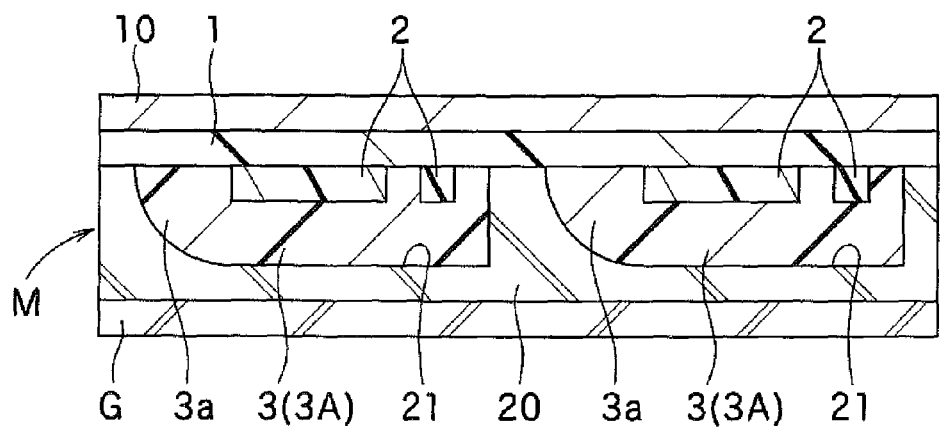
FIG. 3 is a schematic diagram for explaining the inventive optical waveguide production method.

Then, as shown in FIG. 3, the pattern of the cores 2 provided on the under-cladding layer 1 is immersed in the photosensitive resin 3A as a material for the over-cladding layer 3 and, in this state, the cores 2 are positioned with respect to the cavities 21 of the molding die M. Then, the under-cladding layer 1 is pressed against the molding die M.

A load to be applied when the under-cladding layer 1 is pressed against the molding die M is, for example, 49 to 980 N. Here, a mold portion of the molding die M defining the cavities 21 is formed of the resin and hence is pressure resistant. Therefore, it is possible to press the under-cladding layer 1 into intimate contact with the molding die M for prevention of burr formation.

Figure 4:
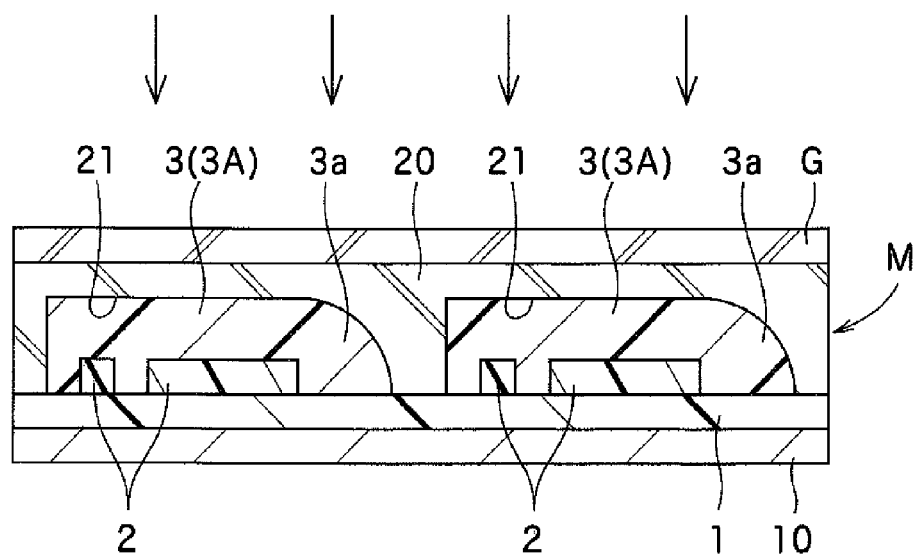
FIG. 4 is a schematic diagram for explaining the inventive optical waveguide production method.

Then, as shown in FIG. 4 (upside down from FIG. 3), the photosensitive resin 3A is irradiated with radiation such as ultraviolet radiation through the molding die M to be thereby exposed. Thus, the photosensitive resin 3A is cured, whereby the over-cladding layer 3 is formed as having a lens portion 3a along one edge portion thereof. During the exposure by the irradiation with the ultraviolet radiation or the like, the metal substrate 10 is fixed to a working stage (not shown) by suction. The over-cladding layer 3 has a thickness of, for example, 25 to 1500 μm (as measured from the surface of the under-cladding layer 1).

Subsequently, the over-cladding layer 3 is removed together with the metal substrate 10, the under-cladding layer 1 and the cores 2 from the molding die M. Thus, as shown in FIG. 5, optical waveguides are provided, which each include the under-cladding layer 1, the cores 2 and the over-cladding layer 3 provided on the surface of the metal substrate 10. In this embodiment, two optical waveguides are produced but, in general, two or more optical waveguides are produced and are individually cut out to be used for various applications.

Before or after the over-cladding layer 3 is removed from the molding die, a heat treatment (e.g., at about 70° C. to about 90° C.) is optionally performed as required. As required, the metal substrate 10 may be separated from the under-cladding layer 1.

In the embodiment described above, the over-cladding layer 3 includes the lens portion 3a provided along the one edge portion thereof, but the one edge portion may be flat like the other edge portion.

<<Use Applications of Optical Waveguides>>

The optical waveguides may be each configured in a planar L-shape, are used for finger touch position detection means or the like (position sensor) for a touch panel. More specifically, two planar L-shaped optical waveguides are produced, which each include a plurality of cores 2 extending from a corner of the planar L-shape to inner edges and equidistantly arranged in juxtaposition. Then, a light emitting element is optically coupled to an outer corner of one of the optical waveguides, and a light receiving element is optically coupled to an outer corner of the other optical waveguide. In turn, these optical waveguides are located along peripheral edges of a rectangular display screen of the touch panel for use as the finger touch position detection means or the like for the touch panel.

EXAMPLES

Inventive examples will be described in conjunction with a comparative example. However, it should be noted that the invention be not limited to the inventive examples.

Example 1

Preparation of Varnish for Formation of Under-Cladding Layer

First, 75 parts by weight of an epoxy resin (EHPE-3150 available from Daicel Chemical Industries, Ltd.), 25 parts by weight of an epoxy resin (MARPROOF G-0150M available from NOF Corporation), 5 parts by weight of a UV absorber (TINUVIH479 available from Ciba Japan KK) and 4 parts by weight of a photoacid generator (CPI-200K available from San-Apro Ltd.) were added to 70 parts by weight of a solvent (cyclohexanone available from Wako Pure Chemical Industries Ltd.) and completely dissolved in the solvent by stirring the resulting mixture under heating at 80° C. Thus, a varnish was prepared for formation of an under-cladding layer.

<Formation of Under-Cladding Layer>

The varnish thus prepared was applied onto a SUS substrate (having a thickness of 50 μm) by using a spin coater (at 5000 rpm for 10 seconds), and then dried at 150° C. for 3 minutes in a drying oven. The resulting uncured under-cladding layer film was exposed (to B-line at 1000 mJ (365 nm)) by means of a UV illuminator, whereby the under-cladding layer was formed (as having a thickness of 15 μm). A post-exposure heat treatment was not performed, but heat generated during the exposure was utilized for polymerization of epoxy groups.

<Preparation of Varnish for Formation of Cores and Alignment Marks>

First, 0.55 parts by weight of a photoradical polymerization initiator (IRGACURE 907 available from Ciba Japan KK) and 5.5 parts by weight of a photoradical polymerization initiator (IRGACURE 184 available from Ciba Japan KK) were added to 100 parts by weight of a butyl acetate solution of an acryl resin (FNR-040 having a solid concentration of 55 wt % and available from Nagase ChemteX Corporation), and then completely dissolved in the solution by stirring the resulting mixture under heating at 50° C. Thus, a varnish (acryl varnish) was prepared for formation of cores and alignment marks.

<Formation of Core Pattern and Alignment Marks>

The acryl varnish was applied onto the formed under-cladding layer with the use of an applicator (having an applicator gap of about 150 μm), and dried at 150° C. for 3 minutes in a drying oven. After the drying, the resulting varnish film was exposed (to I-line at 3000 mJ) via a photomask for formation of the optical waveguide pattern (core pattern) and the alignment marks. Then, a developing process was performed with the use of γ-butyrolactone by means of a spray developing machine, and then an unexposed portion was rinsed away with water, followed by drying. Thus, the core pattern and the alignment marks were formed on the under-cladding layer.

The shapes of the alignment marks thus formed were checked and measured in the following manner. The shapes of the alignment marks were checked by taking an image of the alignment marks by means of a scanning electron microscope (SEM). The taper angles and the taper widths of the alignment marks were measured on the image taken by means of the SEM. As a result, it was confirmed that the alignment marks were generally cylindrical and each had a top surface having a tapered peripheral edge. The alignment marks were each configured as shown in FIG. 6 to have a taper angle θ of 30 to 45 degrees and a taper width W of 4.0 μm.

Example 2

The core pattern and the alignment marks were formed on the under-cladding layer in substantially the same manner as in Example 1, except that the photoradical polymerization initiator (IRGACURE 907 available from Ciba Japan KK) was added in an amount of 0.37 parts by weight for the preparation of the varnish for the formation of the cores and the alignment marks.

The shapes of the alignment marks thus formed were checked and measured in the same manner as in Example 1. As a result, it was confirmed that the alignment marks were generally cylindrical and each had a top surface having a tapered peripheral edge. The alignment marks were each configured as shown in FIG. 6 to have a taper angle θ of 30 to 45 degrees and a taper width W of 6.0 μm.

Comparative Example 1

Preparation of Varnish for Formation of Cores and Alignment Marks

First, 85 parts by weight of an epoxy resin (157S70 available from Japan Epoxy Resin Co., Ltd.), 10 parts by weight of an epoxy resin (MARPROOF G-0250SP available from NOF Corporation), 5 parts by weight of an epoxy resin (EPICOAT 828 available from Japan Epoxy Resin Co., Ltd.) and 4 parts by weight of a photoacid generator (CPI-200K available from San-Apro Ltd.) were added to 55 parts by weight of a solvent (ethyl lactate available from Wako Pure Chemical Industries Ltd.) and completely dissolved in the solvent by stirring the resulting mixture under heating at 80° C. Thus, a varnish (epoxy varnish) was prepared for formation of cores and alignment marks.

<Formation of Core Pattern and Alignment Marks>

The epoxy varnish was applied on the formed under-cladding layer with the use of an applicator (having an applicator gap of about 125 μm), and dried at 150° C. for 3 minutes in a drying oven. After the drying, the resulting varnish film was exposed (to I-line at 3000 mJ) via a photomask for formation of the optical waveguide pattern (core pattern) and the alignment marks, and then heat-treated at 120° C. for 10 minutes.

Subsequently, a developing process was performed with the use of γ-butyrolactone by means of a spray developing machine, and then an unexposed portion was rinsed away with water, followed by drying. Thus, the core pattern and the alignment marks were formed on the under-cladding layer.

The shapes of the alignment marks thus formed were checked and measured in the same manner as in Example 1. As a result, it was confirmed that the alignment marks were generally cylindrical and each had a top surface having a slightly tapered peripheral edge. The alignment marks were each configured as shown in FIG. 6 to have a taper angle θ of 30 to 45 degrees and a very small taper width W on the order of 1.4 μm.

The properties of the products of the inventive examples and the comparative example produced in the aforementioned manner were measured and evaluated. The results are shown below in Table 1.

<Visual Detectability>

The machine visual detectability of the alignment marks was checked and evaluated by emitting light (at a wavelength of 660 nm) from the side of the under-cladding layer by means of an image processing system (MANUFACTURING SYSTEM IV-S210X available from Sharp Corporation and including an alignment camera). As a result, a product having alignment marks each clearly detected as usual with the unwanted SUS image pick-up suppressed was rated as acceptable (o), and a product having alignment marks each hardly visually detectable due to the SUS image pick-up was rated as unacceptable (x).

<Transmission Loss of Optical Waveguide>

A transmission loss per a length of 5 cm (dB/5 cm) of each of the products of the inventive examples and the comparative example at a wavelength of 850 nm was measured by a cut-back method.

TABLE 1

|  | Example 1 | Example 2 | Comparative Example 1 |
|---|---|---|---|
| Material for alignment marks | Acryl varnish | Acryl varnish | Epoxy varnish |
| Taper angle (degree) | 30 to 45 | 30 to 45 | 30 to 45 |
| Taper width (μm) | 4.0 | 6.0 | 1.4 |
| Visual detectability by camera (SUS image pick-up) | o | o | x |
| Optical waveguide transmission loss (dB/5 cm at 850 nm) | 1.2 | 1.1 | 2.0 |

According to the above results, the products of the inventive examples were excellent in the visual detectability of the alignment marks by the alignment camera without significant increase in transmission loss. On the other hand, the product of the comparative example produced by using the epoxy varnish was poorer in the visual detectability of the alignment marks by the alignment camera because of unsatisfactorily tapered peripheral edges of the alignment marks.

<Production of Optical Waveguide>

Next, an optical waveguide was produced. More specifically, a molding die M including a cured light-transmissive resin (silicone resin) body 20 and a quartz glass plate G for the formation of the over-cladding layer as shown in FIG. 1C was prepared, and the optical waveguide (see FIG. 5) was produced by the optical waveguide production method according to the embodiment described above by using the under-cladding layer formation varnish (also used for the formation of the over-cladding layer) and the core and alignment mark formation varnish (acryl varnish) prepared in each of the inventive examples. The alignment marks were excellent in visual detectability when being viewed by the image processing system (MANUFACTURING SYSTEM IV-S210X available from Sharp Corporation and including an alignment camera). Therefore, the optical waveguide was produced at a higher working efficiency.

The optical waveguide production method is applicable to production of an optical waveguide to be used for finger touch position detection means and the like (position sensor) for optical communications, optical information processing, and touch panels.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide production method comprising:
   forming an under-cladding layer on a surface of a metal substrate;
   forming a core in a pattern on a surface of the under-cladding layer;
   forming an alignment mark at a predetermined position on the under-cladding layer, wherein the alignment mark is generally cylindrical, and has a tapered top surface peripheral edge having a taper angle of 30 to 45 degrees and a taper width of 4 to 6 μm;
   preparing a molding die which includes a cavity having a mold surface complementary in shape to an over-cladding layer and has an alignment mark provided at a predetermined position to be associated with the alignment mark formed on the under-cladding layer;
   bringing the molding die, with its cavity facing upward, under the metal substrate formed with the core and the under-cladding layer so that the cavity of the molding die is positioned in opposed relation to the under-cladding layer of the metal substrate, and positioning the molding die with respect to the under-cladding layer of the metal substrate with reference to the pair of alignment marks associated with each other by utilizing light emitted at a wavelength of 400 to 700 nm from a molding die side; and
   forming the over-cladding layer to cover the core;
   wherein a material for the alignment mark formed at the predetermined position on the under-cladding layer is a photo-curable composition comprising the following components (A) and (B):
   (A) a polymerizable compound having a (meth)acrylate group; and
   (B) a photoradical polymerization initiator.

2. The optical waveguide production method according to claim 1, wherein an alignment camera is used for the positioning.

3. The optical waveguide production method according to claim 2,
   wherein the step of forming the alignment mark at the predetermined position on the under-cladding layer is performed concurrently with the step of forming the core in the pattern on the surface of the under-cladding layer,
   wherein the same material is used for the core and for the alignment mark on the under-cladding layer.

4. The optical waveguide production method according to claim 2,
wherein the molding die is formed of a light transmissive resin,
wherein the step of positioning the molding die with respect to the metal substrate with reference to the alignment marks includes the step of viewing the alignment marks through the molding die from a back side of the molding die of the light transmissive resin by means of an alignment camera to align the alignment marks with each other,
wherein the step of forming the over-cladding layer includes the steps of filling the cavity of the molding die of the light transmissive resin with an over-cladding layer formation photosensitive resin, exposing the photosensitive resin through the molding die to cure the photosensitive resin with the core embedded in the photosensitive resin to form the over-cladding layer.

5. The optical waveguide production method according to claim 2, wherein the mold surface of the cavity of the molding die has a curved lens surface which corresponds to a portion of the over-cladding layer covering a distal end of the core.

6. The optical waveguide production method according to claim 1,
wherein the step of forming the alignment mark at the predetermined position on the under-cladding layer is performed concurrently with the step of forming the core in the pattern on the surface of the under-cladding layer,
wherein the same material is used for the core and for the alignment mark on the under-cladding layer.

7. The optical waveguide production method according to claim 1,
wherein the molding die is formed of a light transmissive resin,
wherein the step of positioning the molding die with respect to the metal substrate with reference to the alignment marks includes the step of viewing the alignment marks through the molding die from a back side of the molding die of the light transmissive resin by means of an alignment camera to align the alignment marks with each other,
wherein the step of forming the over-cladding layer includes the steps of filling the cavity of the molding die of the light transmissive resin with an over-cladding layer formation photosensitive resin, exposing the photosensitive resin through the molding die to cure the photosensitive resin with the core embedded in the photosensitive resin to form the over-cladding layer.

8. The optical waveguide production method according to claim 1, wherein the mold surface of the cavity of the molding die has a curved lens surface which corresponds to a portion of the over-cladding layer covering a distal end of the core.

* * * * *